Dec. 3, 1957  S. M. HELLMAN  2,815,060
MEANS FOR MOUNTING ANTI-SKID TIRE CHAINS ON TIRES
Filed July 16, 1954
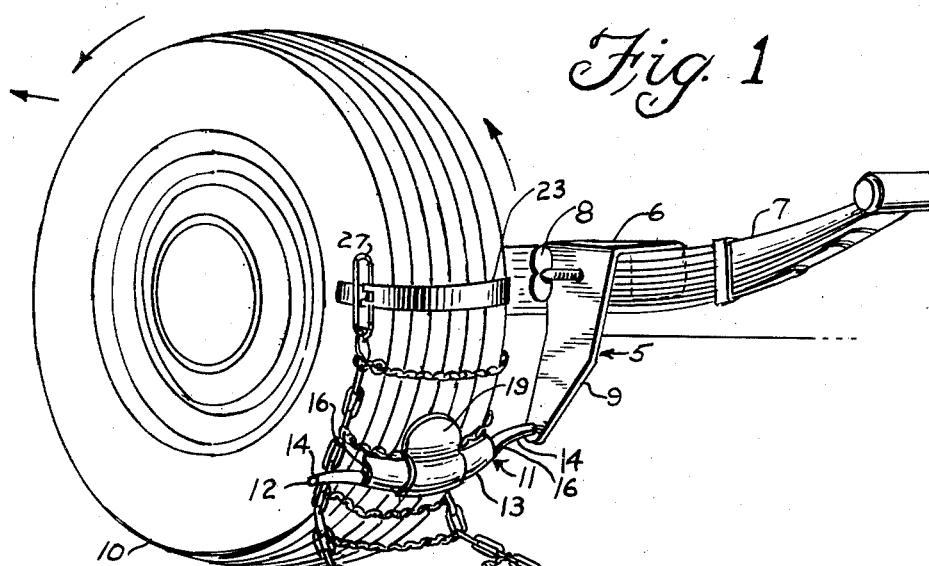
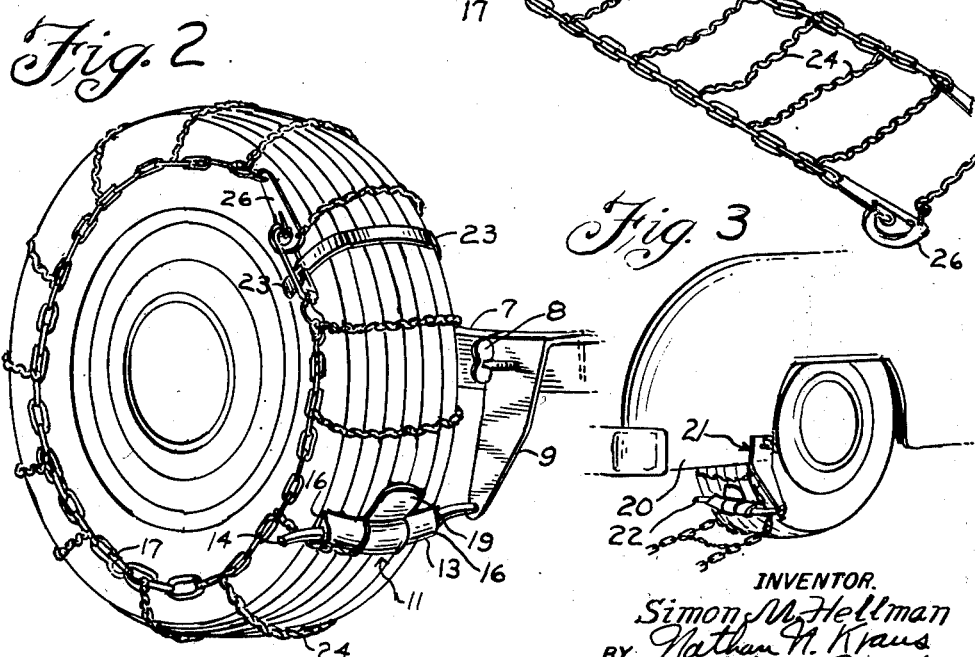
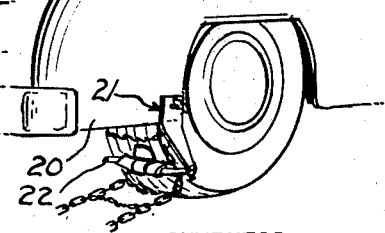
INVENTOR.
Simon M. Hellman
BY Nathan H. Kraus
Frank H. Marks
ATTORNEYS

United States Patent Office 2,815,060
Patented Dec. 3, 1957

2,815,060

MEANS FOR MOUNTING ANTI-SKID TIRE CHAINS ON TIRES

Simon M. Hellman, Waukegan, Ill.

Application July 16, 1954, Serial No. 443,839

4 Claims. (Cl. 152—214)

My invention relates to means for mounting anti-skid tire chains on automobile tires.

It is known that the mounting of conventional anti-skid tire chains on automobile tires has been attended with considerable inconvenience and difficulty on the part of an automobile operator to the extent that many such operators if required to use chains prefer to have the same mounted by an attendant in a garage or service station in order to avoid reaching in under the car behind the rear wheels to effect securement of the tire chains on the tires. Of course such service is not always available or conveniently accessible and an operator must frequently perform the unpleasant task himself. In my copending applications, Serial No. 415,773, and 421,238, now abandoned, there are described means for automatically coupling tire chains on tires whereby an automobile operator may mount tire chains on his automobile with a minimum of inconvenience and effort.

The instant invention is related to means for assisting in the mounting of anti-skid tire chains on automobile tires and has for its prime object the provision of a novel guide member adapted to be attached to a lower portion of an automotive vehicle, such as a fender or leaf spring, whereby an anti-skid chain may be automatically guided into proper position on the tire as the wheels are caused to be rotated, without the necessity for manual manipulation of the chains.

Other and further objects and advantages of my invention will become apparent from the following description when taken in connection with the accompanying drawings in which:

Fig. 1 is a perspective view showing the guide member of my invention attached to the leaf spring of an automotive vehicle and also illustrating the initial step in carrying out the method of my invention.

Fig. 2 is a similar view showing an anti-skid tire chain completely mounted on a tire.

Fig. 3 is a perspective view of a modified embodiment of my invention showing the bracket attached to the rear fender of an automobile.

Referring to the drawings, particularly Figs. 1 and 2, my invention comprises a bracket generally indicated by the numeral 5 and formed preferably of sheet metal, the upper portion of which is formed to provide a saddle portion 6 arranged to rest on a rear leaf spring 7 of an automotive vehicle. A wing screw 8 is threadingly engaged in preferably the outer leg 9 of the saddle portion 6 for effecting securement of the bracket 5 to the spring 7. The outer leg of the saddle portion is extended downwardly, as illustrated in Figs. 1 and 2, and secured to the end thereof is a guide member generally indicated by numeral 11 and shaped substantially like that illustrated in Figs. 1 and 2. The said guide member is, of course, in rigid relation to the supporting bracket 5 and extends laterally thereof transversely across the tire 10.

The guide member 11 may be of any suitable form but in the embodiment illustrated it comprises a bar member 12 the medial portion of which is arcuately formed and corresponds substantially to the curvature of the tread of a tire. The terminal portions 14 are reversely curved as illustrated and preferably extend a short distance beyond the planes of the side walls of the tire. Preferably, the medial portion of the guide member is of greater cross-sectional area than the terminal portions 14 so as to provide spaced shoulders 16 which serve to maintain the side chain members 17 and 18 in spaced relation as illustrated in Fig. 1 during the mounting operation and in proper condition for mounting on a tire. This increased cross-sectional area may be formed by applying a sleeve 13 of rubber or plastic on the bar member 12. Correspondingly the terminal portions 14 may be covered with similar material. Substantially midway of the medial portion of the guide member there is attached a resilient finger 19 which may be of rubber or other suitable material and is inclined in a direction to engage the tread of the tire.

Referring to Fig. 3 the bracket 21 is of somewhat modified form being so constructed that it may be secured to the marginal edge portion of a fender 20. The rest of the structure is identical with that illustrated in Figs. 1 and 2. It will be noted however that in the modified embodiment the guide member 22 thereof extends inwardly with relation to the bracket 21 while in the first described embodiment the guide member 11 extends outwardly in relation to the bracket 5.

In use the bracket 5 or 21 is attached to a spring or fender of an automotive vehicle as the case may be so that the respective guide members 11 or 22 extend transversely substantially parallel to the tire tread, about four to six inches above the ground surface. The said guide member is also spaced from the tire tread about one and one-half to two inches. At this distance the resilient finger 19 engages the tread of the tire. The guide member of my invention may be used with a tire chain structure such as is described in my copending applications, Serial Nos. 415,773 and 421,238, now abandoned. This structure includes a substantially U-shaped resilient gripping member 23 which is applied to the tire in the manner illustrated in Fig. 1, the said gripping member being applied to the tire at a convenient position slightly above the guide member 11. The side chain members 17 and 18 of the anti-skid chain are then stretched out in spaced parallel relation behind the tire in the manner illustrated in Fig. 1 so that the transverse tread chains 24 may pass in the space between the guide member 11 and the tire tread. The chain is now in position for mounting and when the operator causes the vehicle to move forwardly so that the wheels rotate in the direction indicated by the arrows in Fig. 1, the side chain members 17 and 18 are caused to pass over the inner surface of the terminal portions 14 of the guide member while the transverse tread chains 24 pass through the space between the guide member 11 and the tire tread with the resilient finger 19 frictionally engaging each of the transverse tread chains and causing tension to be applied to the side chain members 17 and 18 to maintain the same in substantially taut condition. When the tire has completed a revolution to assume substantially the position illustrated in Fig. 2, the fastening means 26 described in my copending applications hereinabove noted are caused to engage in the links 27 to effect securement of the chain on the tire. After mounting of the chains on the tires the bracket and guide member preferably may be removed.

It will be understood that the chains are mounted on both rear tires simultaneously and accordingly, the brackets and guide members must be arranged in pairs to cooperate with the right and left hand portions of the vehicle to which the said guides are attached.

Various changes coming within the spirit of my invention may suggest themselves to those skilled in the

I claim:

1. Means for assisting in the mounting on a wheel of a vehicle an anti-skid tire chain consisting of two longitudinally extending side chain members and a plurality of longitudinally spaced transverse chain members connected thereto, said means comprising a bracket secured in depending relation to a lower part of the vehicle rearwardly of a wheel thereof, a bar member secured to said bracket and extending laterally thereof across the width of the wheel in close proximity to the tread thereof below the horizontal plane of the axle of said wheel, said tire chain when being mounted on said wheel being caused to wipe against the inner surface of said bar member as the wheel is caused to be rotated in a forwardly direction.

2. The invention as defined in claim 1 in which the bar member includes means for maintaining the longitudinal side chain members in substantially spaced parallel relation.

3. The invention as defined in claim 1 in which at least the inner medial portion of said bar member is in closer proximity to the wheel tread than the end portions, thereby forming spaced shoulders arranged to maintain the longitudinal side chain members in spaced parallel relation.

4. The invention as defined in claim 1 in which the bar member includes means for resiliently tensioning said longitudinal side chain members during the mounting of said chain on the wheel.

References Cited in the file of this patent

UNITED STATES PATENTS

| | | |
|---|---|---|
| 1,266,507 | Ludwig | May 14, 1918 |
| 2,566,396 | Andrews | Sept. 4, 1951 |
| 2,608,231 | Johnson | Aug. 26, 1952 |